United States Patent
Liu et al.

(10) Patent No.: US 9,551,254 B2
(45) Date of Patent: Jan. 24, 2017

(54) SILENCER AND CATALYTIC CONVERTER APPARATUS WITH ADJUSTABLE BLOCKING PANEL

(71) Applicant: DCL International Inc., Concord (CA)

(72) Inventors: Haiqing Liu, Richmond Hill (CA); John P. Muter, King City (CA); Shazam S. Williams, Toronto (CA)

(73) Assignee: DCL INTERNATIONAL INC., Concord (CA)

( * ) Notice: Subject to any disclaimer, the term of this patent is extended or adjusted under 35 U.S.C. 154(b) by 2 days.

(21) Appl. No.: 14/664,383

(22) Filed: Mar. 20, 2015

(65) Prior Publication Data

US 2016/0273432 A1  Sep. 22, 2016

(51) Int. Cl.
*F01N 3/035* (2006.01)
*F01N 3/021* (2006.01)
*F01N 3/28* (2006.01)
*F01N 3/10* (2006.01)
*F01N 3/02* (2006.01)

(52) U.S. Cl.
CPC .............. *F01N 3/2839* (2013.01); *F01N 3/10* (2013.01); *F01N 2230/04* (2013.01); *F01N 2260/14* (2013.01)

(58) Field of Classification Search
CPC ........ F01N 3/2839; F01N 3/10; F01N 3/2875; F01N 3/2878; F01N 2230/04; F01N 13/0097; F01N 13/011; F01N 13/017; B01J 19/18; B01J 19/0073
USPC .. 181/258, 241, 243, 271, 277, 278; 60/299; 422/180, 168, 177
See application file for complete search history.

(56) References Cited

U.S. PATENT DOCUMENTS

| | | | | |
|---|---|---|---|---|
| 3,097,074 A | * | 7/1963 | Johnson | F01N 3/2053 181/254 |
| 4,092,194 A | * | 5/1978 | Green | B01D 53/86 138/177 |
| 4,348,360 A | | 9/1982 | Chang et al. | |
| 4,849,185 A | | 7/1989 | Wittig | |
| 5,015,442 A | * | 5/1991 | Hirai | A61L 9/015 261/DIG. 88 |
| 5,067,319 A | * | 11/1991 | Moser | F01N 3/031 422/169 |
| 5,097,665 A | * | 3/1992 | Kammel | B01D 53/944 55/DIG. 30 |
| 5,144,796 A | * | 9/1992 | Swars | F01N 3/2053 422/180 |
| 5,169,604 A | | 12/1992 | Crothers, Jr. | |
| 5,211,012 A | * | 5/1993 | Swars | F01N 3/2053 422/168 |
| 5,323,608 A | | 6/1994 | Honma | |

(Continued)

*Primary Examiner* — Edgardo San Martin
(74) *Attorney, Agent, or Firm* — Bereskin & Parr LLP/S.E.N.C.R.L., s.r.l.

(57) ABSTRACT

A silencer and catalytic converter apparatus includes a housing and a frame assembly arranged in the housing. The frame assembly may receive at least one catalyst panel and support the catalyst panel to occupy an area of a flow passage between upstream and downstream chamber sections of the housing. A blocking panel may be supported by the frame assembly to obstruct a remaining area of the flow passage so that fluid flowing between the upstream and downstream chamber sections is directed to flow through the catalyst panel. The blocking panel may be adjustable to accommodate catalyst panels of different sizes.

19 Claims, 14 Drawing Sheets

(56) References Cited

U.S. PATENT DOCUMENTS

| | | | | |
|---|---|---|---|---|
| 5,345,762 | A | * | 9/1994 | Lutze .................... F01N 3/2006 422/177 |
| 5,582,003 | A | * | 12/1996 | Patil ................... B01D 53/9454 60/284 |
| 5,656,245 | A | | 8/1997 | Fujisawa et al. |
| 5,746,986 | A | | 5/1998 | Pollock et al. |
| 5,787,706 | A | * | 8/1998 | Smedler ............. B01D 53/9481 60/288 |
| 5,921,079 | A | * | 7/1999 | Harris ................ B01D 53/9454 422/177 |
| 6,089,347 | A | | 7/2000 | Flugger |
| 7,157,060 | B1 | | 1/2007 | Newburry |
| 7,281,606 | B2 | | 10/2007 | Marocco |
| 7,410,621 | B2 | * | 8/2008 | Muter ................... F01N 3/2839 422/168 |
| 7,412,824 | B1 | | 8/2008 | Newburry et al. |
| 7,655,194 | B2 | | 2/2010 | Muter |
| 7,919,052 | B2 | | 4/2011 | Ahmed |
| 8,062,602 | B2 | | 11/2011 | Roe et al. |
| 8,066,950 | B2 | | 11/2011 | Newburry et al. |
| 8,312,714 | B1 | * | 11/2012 | Cone .................... F01N 3/2882 60/298 |
| 8,932,531 | B2 | | 1/2015 | Muter et al. |
| 9,133,028 | B2 | * | 9/2015 | Army .................. C01B 13/0203 |
| 2002/0141910 | A1 | * | 10/2002 | Adiletta ............. B01D 46/0024 422/171 |
| 2006/0159597 | A1 | | 7/2006 | Muter et al. |
| 2010/0129270 | A1 | | 5/2010 | Roe et al. |
| 2013/0287635 | A1 | | 10/2013 | Muter et al. |
| 2015/0078969 | A1 | | 3/2015 | Muter et al. |
| 2016/0131014 | A1 | | 5/2016 | Hillen et al. |

\* cited by examiner

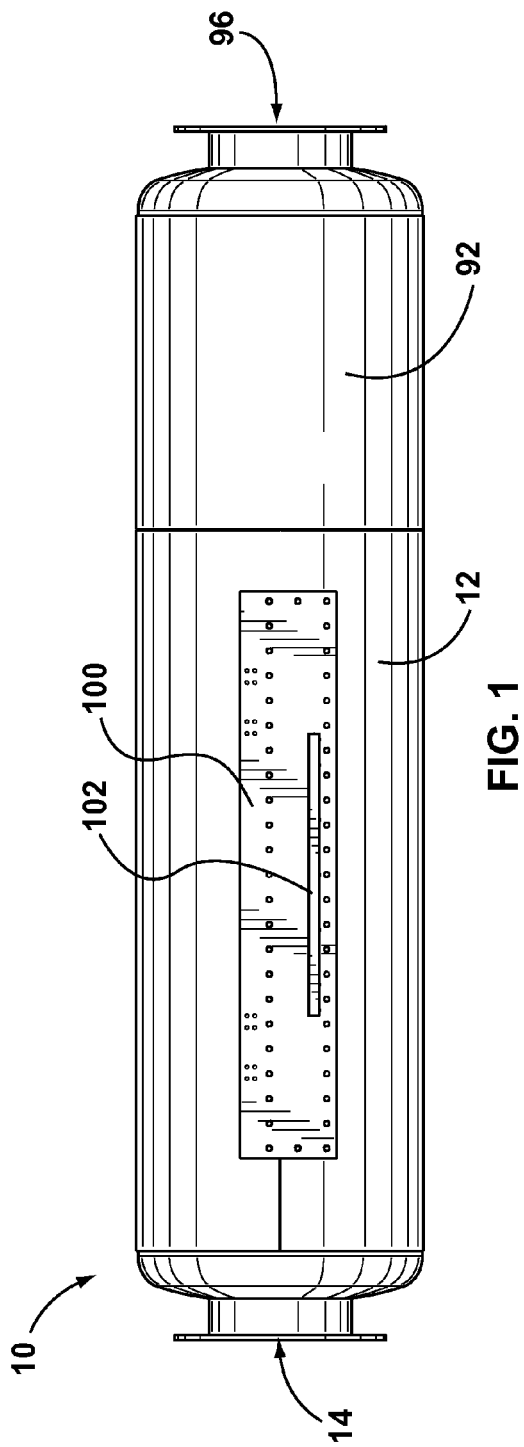
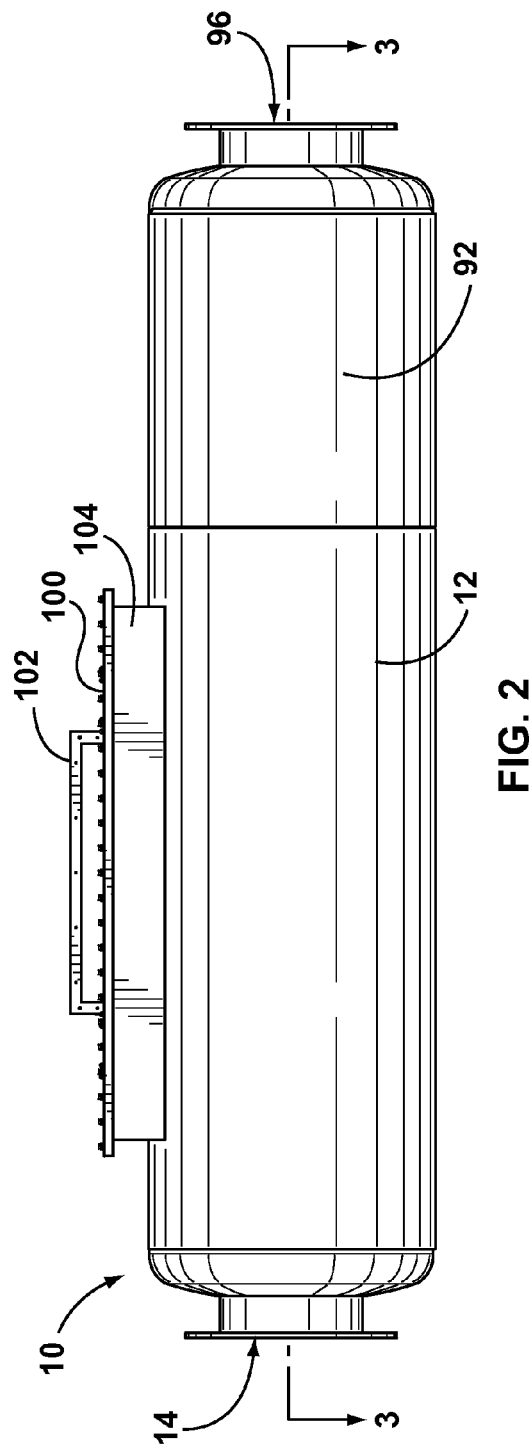

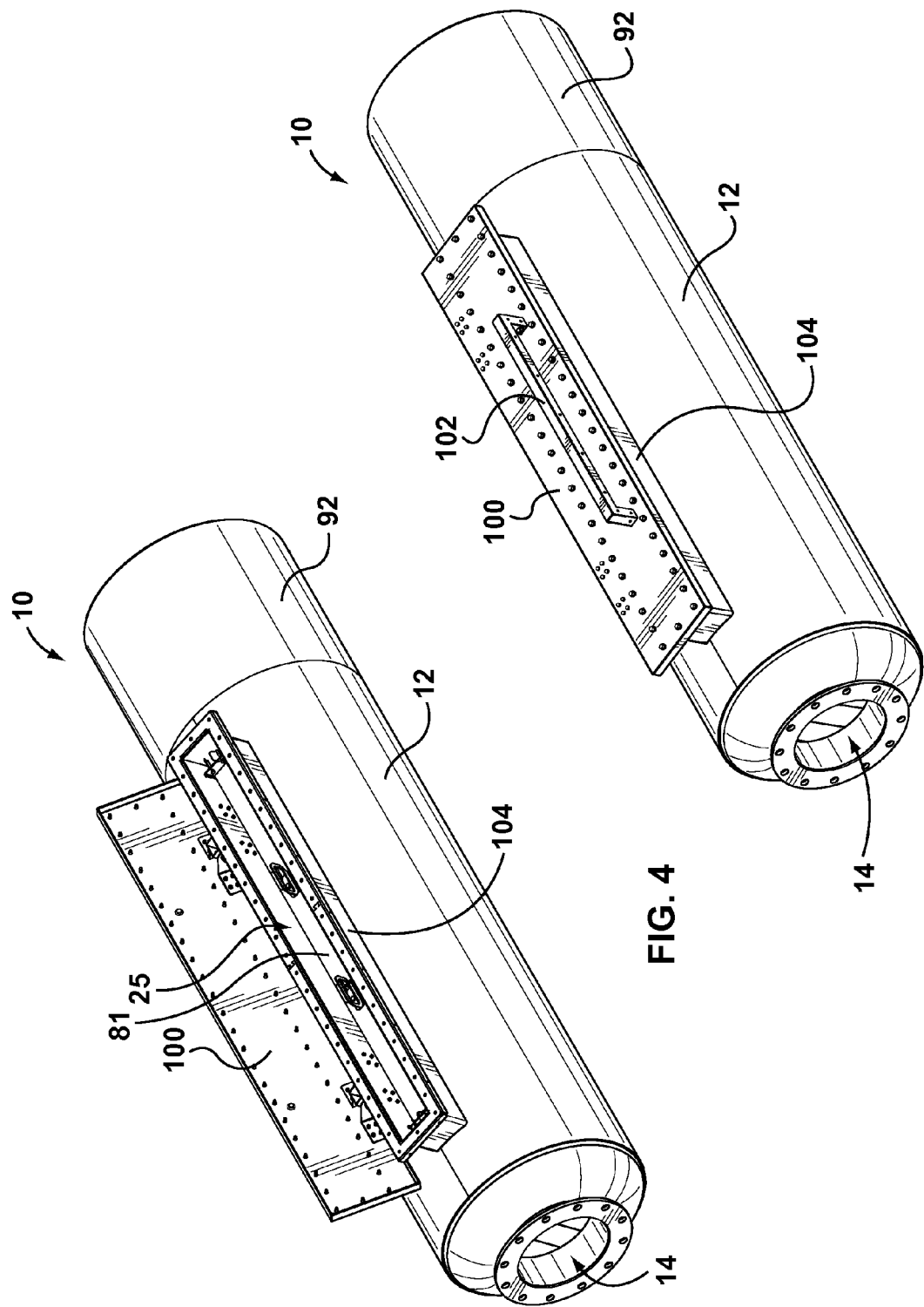

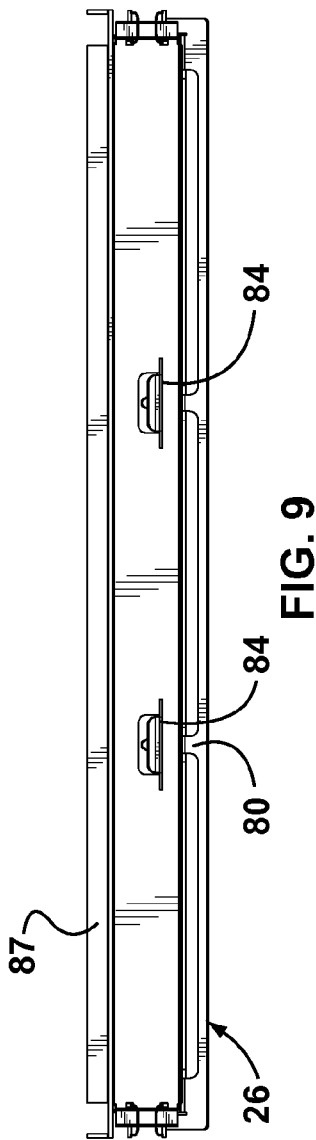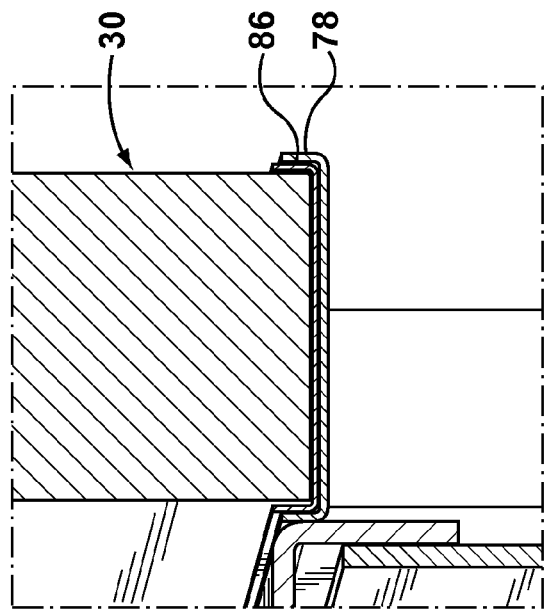

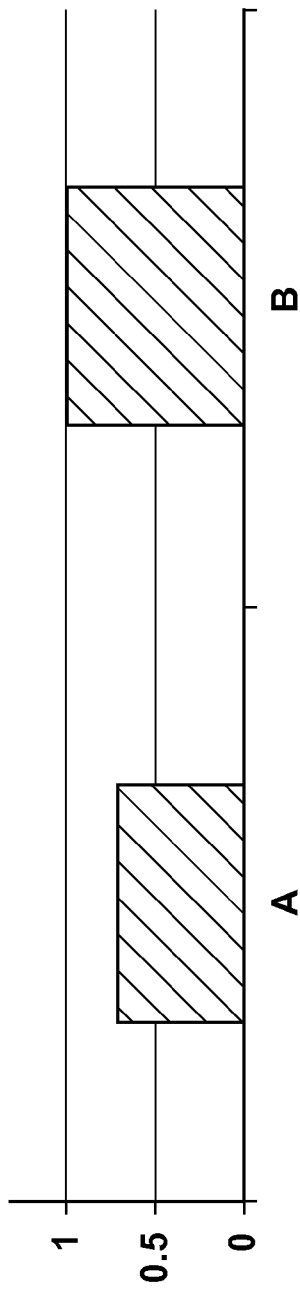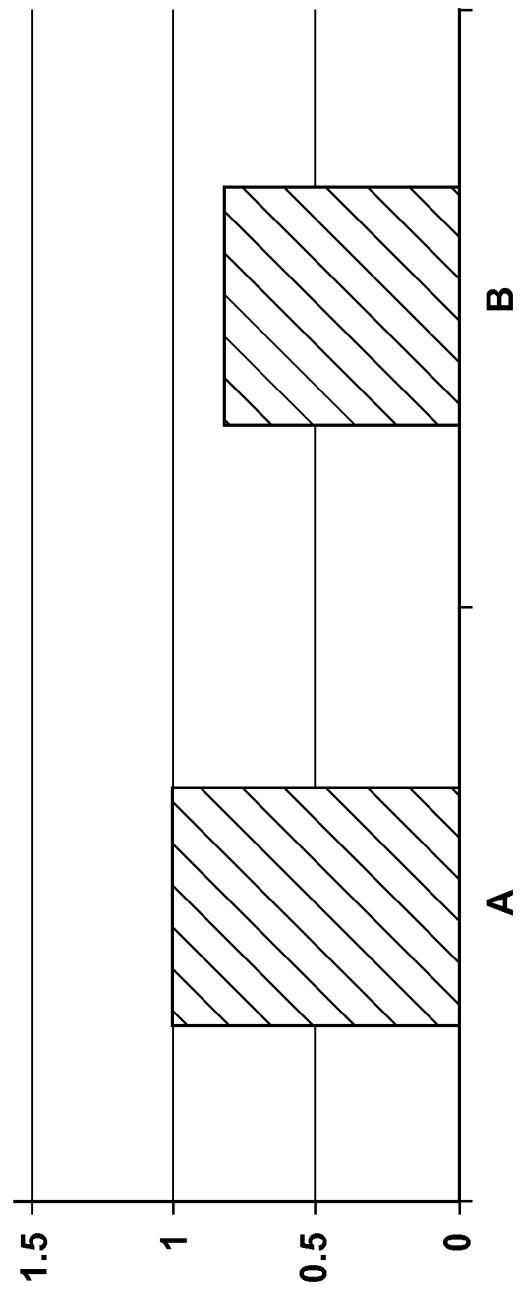
FIG. 17
FIG. 18

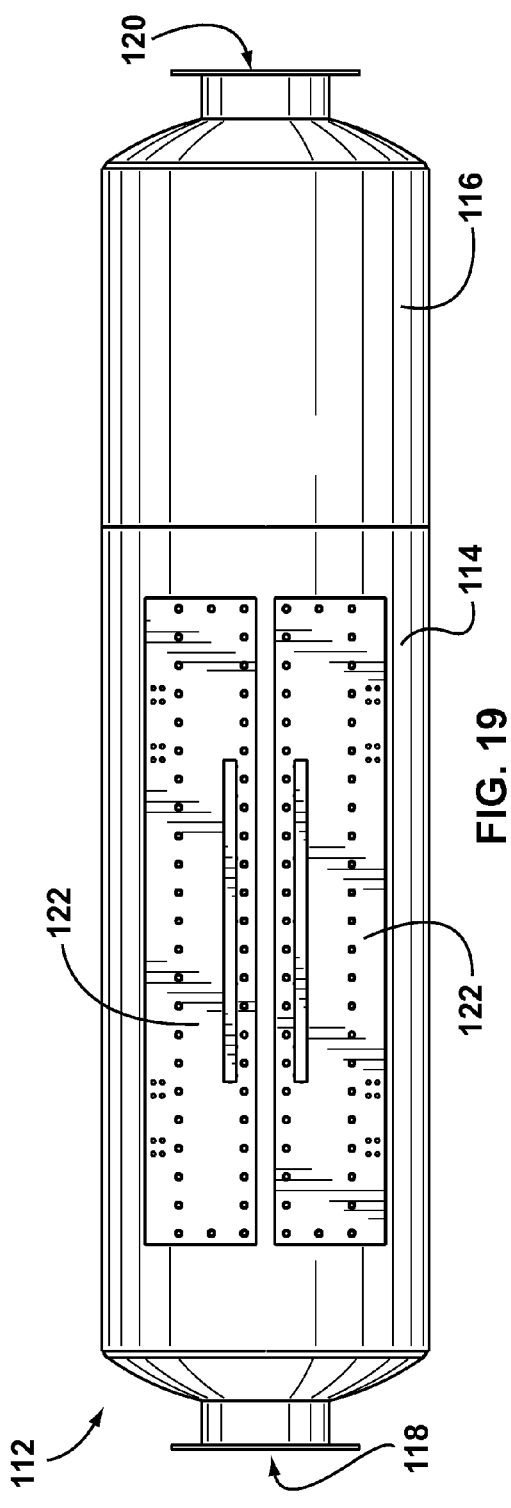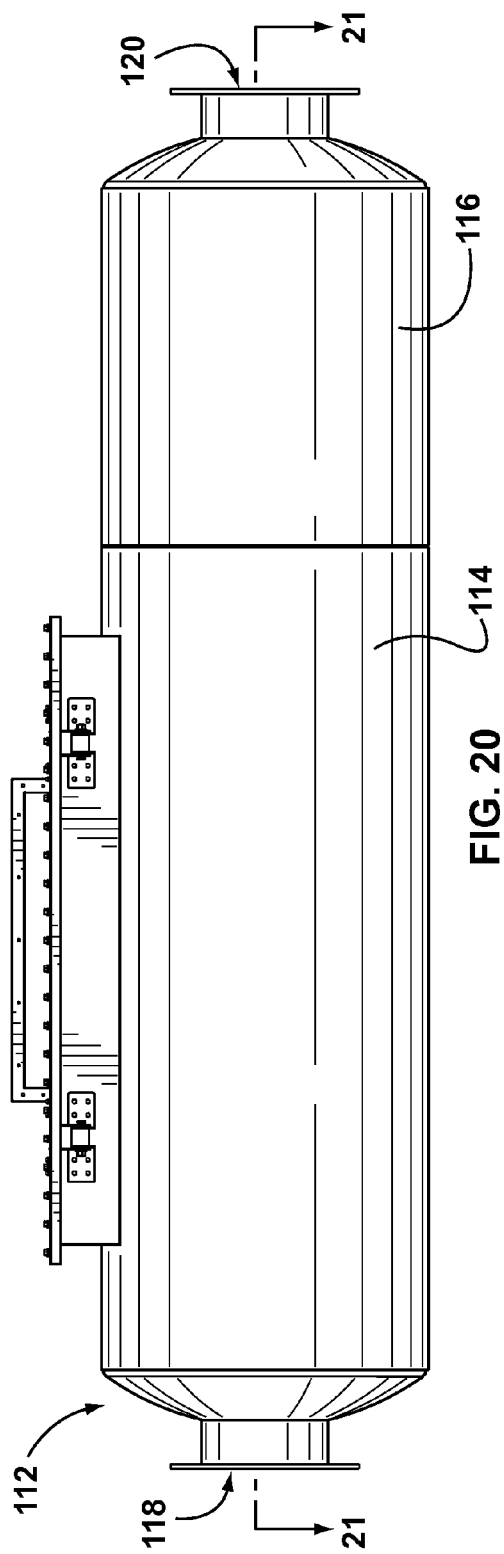

SILENCER AND CATALYTIC CONVERTER APPARATUS WITH ADJUSTABLE BLOCKING PANEL

FIELD

The present disclosure relates generally to silencers and catalytic converters. The present disclosure relates in particular to catalytic converters having removable catalyst panels.

BACKGROUND

The following paragraphs are not an admission that anything discussed in them is prior art or part of the knowledge of persons skilled in the art.

U.S. Pat. No. 4,849,185 A describes an apparatus for effecting high temperature catalytic conversion treatment of exhaust gases flowing in a large volume exhaust path including a plurality of separate catalyst panel assemblies, and a panel support assembly arranged to be mounted within the exhaust path and to separately removably support each of the plurality of catalyst panel assemblies so that high temperature exhaust gases within the exhaust path will flow therethrough in operation and each panel assembly can be conveniently serviced by simple removal. The panel support assembly includes an outer ambient temperature peripheral frame structure, an inner high temperature peripheral frame structure mounted within the outer peripheral frame structure for temperature responsive expansion and contraction with respect thereto, and an expansible and contractible high temperature resistant peripheral seal assembly between the inner and outer peripheral frame structures for maintaining a flow preventing seal therebetween. Each catalyst panel assembly is supported by an arrangement which includes doors openable to permit the catalyst panel assemblies to be removed. Each panel assembly includes a guarded high temperature resistant peripheral seal assembly for insuring that the flow of high temperature exhaust gases within the exhaust path is solely through the catalyst passages thereof.

U.S. Pat. No. 6,089,347 A describes a muffler having a casing, an inlet opening and an outlet opening. An initial partition forms an expansion chamber. The casing has mounted and formed therein a partition array that includes a divider partition, a first intermediate partition, and a second intermediate partition. Partition array is positioned in a main sound attenuation chamber. A collector partition having a collector opening is positioned between array and opening. A pre-outlet chamber is formed by collector partition prior to outlet.

U.S. Pat. No. 7,281,606 B2 describes an exhaust sound and emission control systems for reducing sound and noxious emissions from an automotive exhaust. The system may have an exhaust resonator having one or more catalytic converter elements in combination therewith in a single device. Alternatively, the system may have multiple angularly disposed chambers therein, with a series of swept baffles or guides in one of the chambers, thereby combining resonator and muffler functions in a single device. In another alternative, the system has a series of longitudinal tubes therein in combination with a series of V-shaped guides or vanes, combining catalytic converter, muffler, and resonator functions in a single device. The various elements of the different embodiments, e.g. catalytic converter element(s), double wall shell, perforated tubes and multiple flow paths, interconnecting crossover tubes, etc., may be combined with one another as practicable.

INTRODUCTION

The following is intended to introduce the reader to the detailed description that follows and not to define or limit the claimed subject matter.

In an aspect of the present disclosure, a silencer and catalytic converter apparatus is disclosed that may include: a housing including an inlet port, an outlet port spaced apart from the inlet port in an axial direction, an upstream chamber section enclosed by the housing in fluid communication with the inlet port, a downstream chamber section enclosed by the housing in fluid communication with the outlet port, and an access opening; a frame assembly arranged in the housing and defining a flow passage between the upstream and downstream chamber sections, the frame assembly for receiving at least one catalyst panel inserted through the access opening and supporting the at least one catalyst panel to occupy an area of the flow passage; and a blocking panel supported by the frame assembly to obstruct a remaining area of the flow passage so that fluid flowing between the upstream and downstream chamber sections is directed to flow through the at least one catalyst panel, the blocking panel being adjustable to accommodate catalyst panels of different sizes.

In an aspect of the present disclosure, an apparatus is disclosed that may include: a housing including an inlet port, an outlet port spaced apart from the inlet port in an axial direction, an upstream chamber section enclosed by the housing in fluid communication with the inlet port, a downstream chamber section enclosed by the housing in fluid communication with the outlet port, a first interior partition separating the upstream and downstream chamber sections adjacent to the inlet port, a second interior partition separating the upstream and downstream chamber sections adjacent to the outlet port, and an access opening; a frame assembly arranged in the housing for receiving at least one catalyst panel inserted through the access opening and supporting the at least one catalyst panel, the frame assembly including a first end secured to the first interior partition, a second end secured to the second interior partition, and a lateral flow passage extending between the first and second ends and connecting the upstream and downstream chamber sections in fluid communication; and a blocking panel supported by the frame assembly to obstruct an area of the flow passage so that fluid flowing between the upstream and downstream chamber sections is directed to flow through the at least one catalyst panel, the blocking panel being adjustable to accommodate catalyst panels of different sizes, the blocking panel including first and second plate members that are movable relative to one another between a contracted position and an expanded position in which a width dimension of the blocking panel is greater than in the contracted position.

In an aspect of the present disclosure, a method of installing at least one catalyst panel in a housing of a silencer and catalytic converter apparatus is disclosed. The housing may include an inlet port, an outlet port spaced apart from the inlet port in an axial direction, an upstream chamber section enclosed by the housing in fluid communication with the inlet port, a downstream chamber section enclosed by the housing in fluid communication with the outlet port, a flow passage between the upstream and downstream chamber sections, and an access opening. The method may include:

receiving at least one catalyst panel inserted through the access opening; supporting the at least one catalyst panel to occupy an area of the flow passage; and adjusting a blocking panel to obstruct a remaining area of the flow passage so that fluid flowing between the upstream and downstream chamber sections is directed to flow through the at least one catalyst panel.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings:

FIGS. 1 and 2 are top and side views, respectively, of a first example of a silencer and catalytic converter apparatus;

FIGS. 4 and 5 are perspective views in which a lid of the apparatus is shown in opened and closed positions, respectively;

FIGS. 8, 9 and 10 are side, top and end views, respectively, of the frame assembly, the blocking panel and the catalyst panels;

FIG. 11 is a sectional view of FIG. 8;

FIGS. 17 and 18 are bar graphs;

FIGS. 19 and 20 are top and side views, respectively, of a second example of a silencer and catalytic converter apparatus.

DETAILED DESCRIPTION

Figure 3:
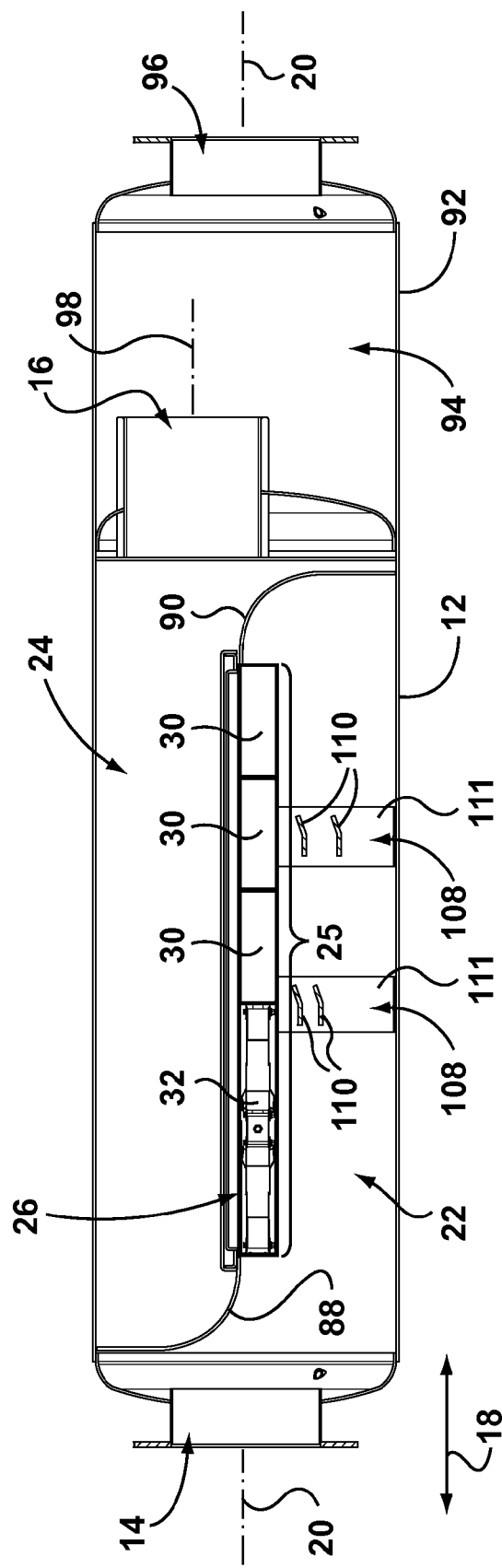
FIG. 3 is a sectional view of FIG. 2.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

In general, the concepts described herein pertain to silencers and catalytic converter apparatuses that may be suitable for use with reciprocating internal combustion engines having a power output, for example, in the range of 100 kW to 2 MW. The apparatus may include a housing, a frame assembly for supporting at least one catalyst panel in the housing to occupy an area of a flow passage, and an adjustable blocking panel for obstructing the remaining area of the flow passage. With the blocking panel, the apparatus may accommodate catalyst panels having different sizes.

Referring to FIGS. 1 and 2, a silencer and catalytic converter apparatus is shown generally at reference numeral 10. The apparatus 10 includes a housing 12.

Referring to FIG. 3, the housing 12 includes an inlet port 14 and an outlet port 16 spaced apart from the inlet port 14 in an axial direction 18. In the example illustrated, the axial direction 18 is parallel to a central axis 20 of the apparatus 10. An upstream chamber section 22 is enclosed by the housing 12 and is in fluid communication with the inlet port 14. A downstream chamber section 24 is enclosed by the housing 12 and is in fluid communication with the outlet port 16.

Referring to FIG. 4, the apparatus 10 includes an access opening 25.

Figure 7:
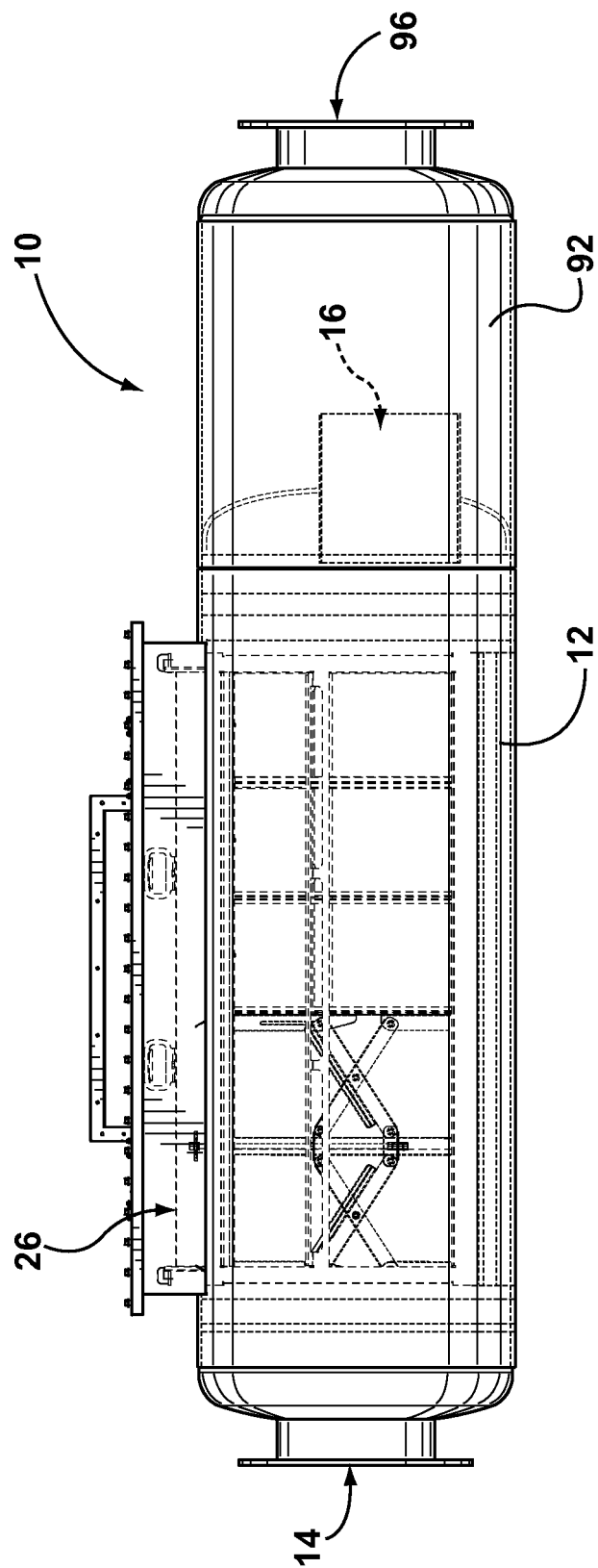
FIG. 7 is a partial ghost side view of the apparatus, showing a frame assembly, a blocking panel and catalyst panels.

Referring to FIG. 7, the apparatus 10 is shown to include a frame assembly 26 arranged in the housing 12.

Figure 8:
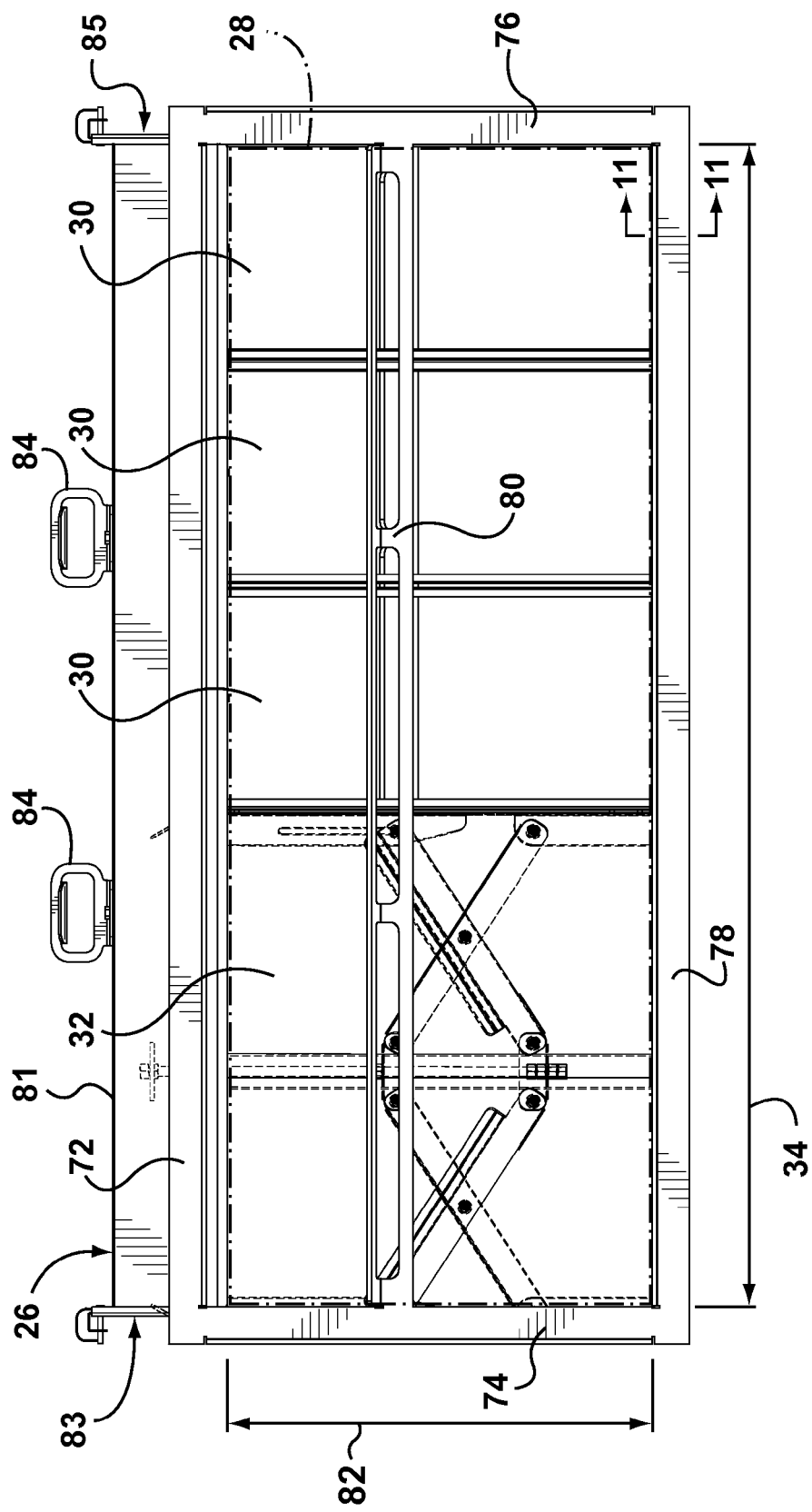

Referring to FIGS. 3 and 8, the frame assembly 26 defines a lateral flow passage 28 between the upstream and downstream chamber sections 22, 24. The frame assembly 26 receives one or more catalyst panels 30 inserted through the access opening 25. The catalyst panels 30 are supported to occupy an area of the flow passage 28. A blocking panel 32 is supported by the frame assembly 26. The blocking panel 32 obstructs a remaining area of the flow passage 28 so that fluid flowing between the upstream and downstream chamber sections 22, 24 is directed to flow through the catalyst panels 30.

The catalyst panels 30 are adapted to treat or otherwise condition fluids that may include, for example but not limited to, exhaust gases from an internal combustion engine, or process fluid from an industrial process. The catalyst panels 30 typically include a substrate that may be formed of, for example but not limited to, a ceramic honeycomb, corrugated metal foil sheets, flat metal foil sheets, and/or another material structured to provide a relatively high surface area for contact with the fluid to be treated, and may be loaded with an effective amount of catalytic material. Catalyst panels suitable for use as the catalyst panels 30 may be commercially available, but manufactured by several different companies according to differing standards and to varying sizes. The blocking panel 32 is adjustable to accommodate catalyst panels of different sizes.

The lateral arrangement of the upstream and downstream chamber sections 22, 24 may result in generally maximizing fluid flow contact with the catalyst panels 30 while also generally minimizing the flow rate, which may avoid an undesirable pressure drop.

In the example illustrated, the flow passage 28 has a width 34 extending in the axial direction 18 partially between the inlet and outlet ports 14, 16. The catalyst panels 30 occupy a portion of the width 34, and the blocking panel 32 is adjustable to obstruct a remaining portion of the width 34 adjacent to the catalyst panels 30.

Figure 12:
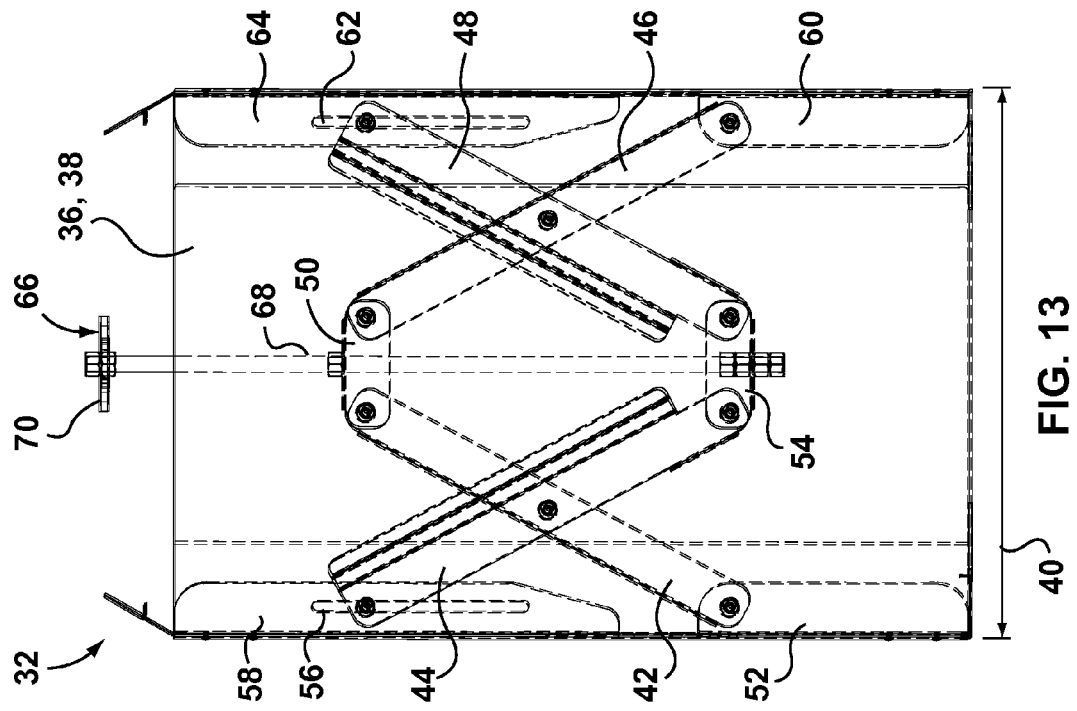
FIGS. 12, 13 and 14 are side views of the blocking panel shown in contracted, intermediate and expanded positions, respectively.
Figure 13:
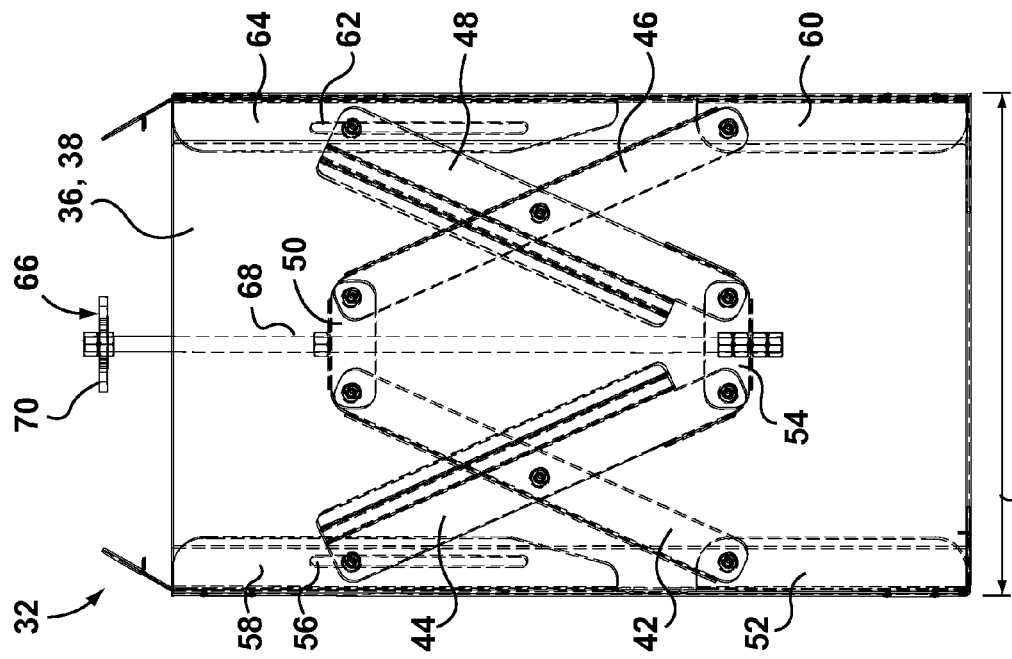
Figure 14:
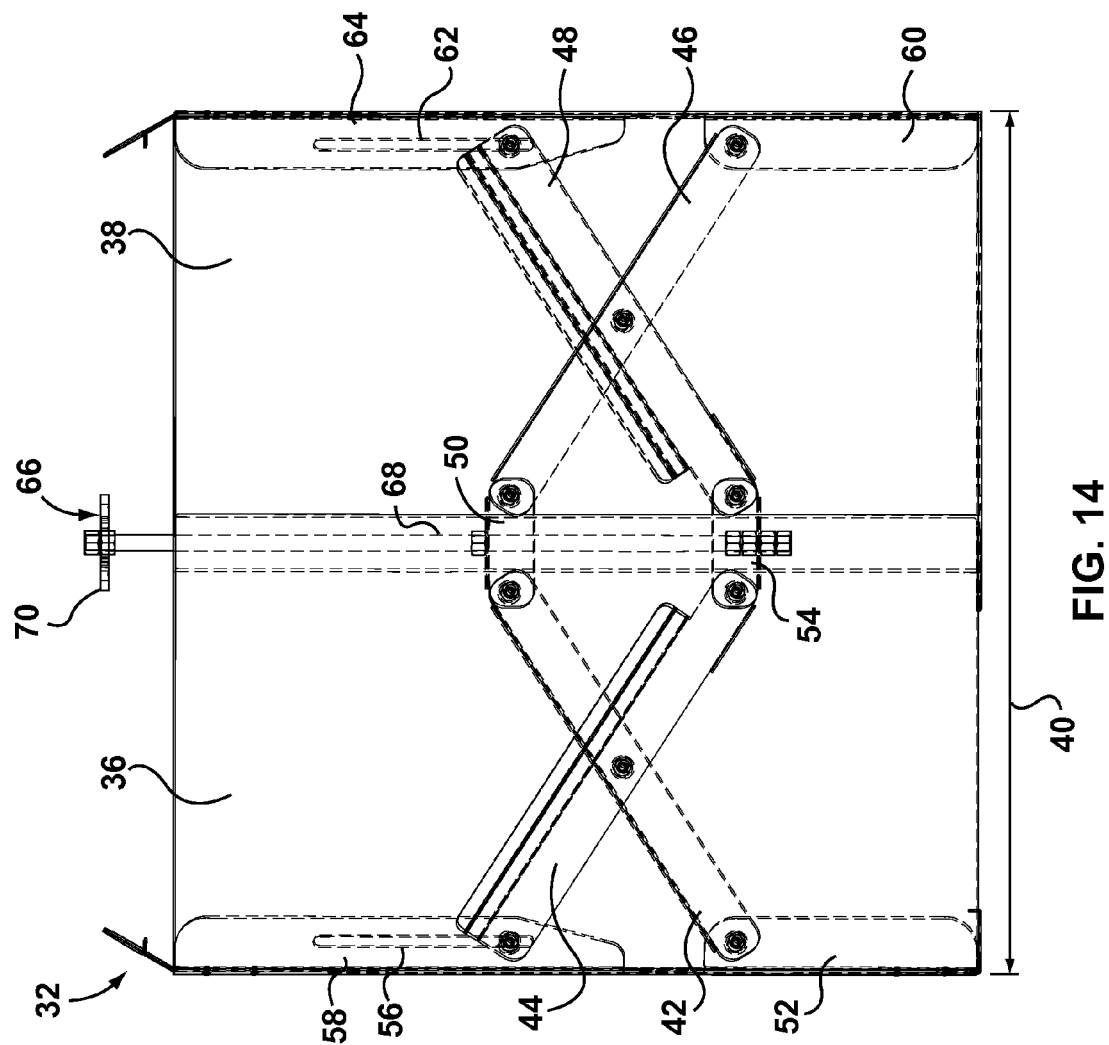

Referring to FIGS. 12, 13 and 14, the blocking panel 32 is shown to include overlapping first and second plate members 36, 38, which are generally fluid impervious. The first and second plate members 36, 38 are movable relative to one another between a contracted position (FIG. 12) and an expanded position (FIG. 14). In the expanded position, a width dimension 40 of the blocking panel 32 is greater than in the contracted position. FIG. 13 shows the blocking panel 32 in an intermediate position. The first and second plate members 36, 38 may be formed of a heat-resistant material such as stainless steel, or a ceramic material.

In the example illustrated, the blocking panel 32 includes first, second, third and fourth scissor segments 42, 44, 46, 48. The first scissor segment 42 is shown having a first end pivotally connected to a connector 50, and a second end pivotally connected to a lower edge portion 52 of the first plate member 36. The second scissor segment 44 is shown having a first end pivotally connected to a connector 54, and a second end connected to a slot 56 in an upper edge portion 58 of the first plate member 36.

Similarly, in the example illustrated, the third scissor segment 46 has a first end pivotally connected to the connector 50, and a second end pivotally connected to a lower edge portion 60 of the second plate member 38. The fourth scissor segment 48 is shown having a first end pivotally connected to the connector 54, and a second end connected to a slot 62 in an upper edge portion 64 of the second plate member 38.

In the example illustrated, the blocking panel 32 includes a control member 66 having a threaded rod 68 and a manipulator 70. The manipulator may be accessible via the access opening 25 (FIG. 4). In the example illustrated, the connector 50 is threaded onto the threaded rod 68 so that rotating the threaded rod raises or lowers the position of the connector 50. In the example illustrated, the connector 54 is rotatably fixed onto a bottom end of the threaded rod 68 so that rotating the threaded rod does not change the position of the connector 54.

Referring to FIG. 12, by rotating the threaded rod 68 in a first direction, the connector 50 is drawn downwardly toward the connector 54, the second ends of the second and third scissor segments 44, 48 slide downwardly within the slots 56, 62, respectively, and the first and second plate members 36, 38 are forced apart to increase the width dimension 40. Referring to FIG. 14, by rotating the threaded rod 68 in a second direction, the connector 50 is drawn upwardly away from the connector 54, the second ends of the second and third scissor segments 44, 48 slide upwardly within the slots 56, 62, respectively, and the first and second plate members 36, 38 are forced together to decrease the width dimension 40.

Referring to FIGS. 8, 9 and 10, the frame assembly 26 is shown to include border members 72, 74, 76, 78, and a middle support 80. The middle support 80 may assist in securing the catalysts panels 30 and the blocking panel into position. In the example illustrated, the frame assembly 26 includes a top bar 81, which extends between and is releasably connected to mounts 83, 85. The top bar 81 may be sealingly received by the access opening 25 (FIG. 4) to block fluid from flowing out of the access opening 25. In the example illustrated, a flange 87 extends about a periphery of the flow passage 28 on a side of the frame assembly 26 leading to the downstream chamber section 24, which may be provided to improve stiffness of the frame assembly 26.

In the example illustrated, the catalyst panels 30 occupy an area of the flow passage 28 across a portion of the width 34, and across a full height 82 of the flow passage 28, whereas the blocking panel 32 obstructs a remaining area of the flow passage 28 across a remaining portion of the width 34, adjacent to the catalyst panels 30, and also across a full height 82 of the flow passage 28. In the example illustrated, the frame assembly 26 further includes handles 84, which may be used to remove the frame assembly entirely out of the housing 12 through the access opening 25.

Referring to FIG. 11, the border member 78 is shown formed by a c-channel member. The c-channel member may ensure that the catalyst panels are held securely in place, and may establish a labyrinth seal in conjunction with a peripheral mantle 86 of the catalyst panels, without a gasket. This structure may also ensure a seal is formed generally about a periphery of the blocking panel 32. Each of the border members 72, 74 and 76 may also be formed of c-channel members. This design may accommodate minor variations in catalyst panel dimensions and rates of expansion and contraction, to ensure that bypass is maintained at an acceptable level. Furthermore, different manufacturers may offer different sizes of catalyst panels, and the use of c-channels may accommodate dimensional variations between the different catalyst panels, particularly with respect to the height of catalyst panels. Most of the variation among different manufacturers may be in the width of the catalyst panels, which is taken up by the blocking panel.

Referring to FIG. 3, the apparatus 10 is shown to include a first interior partition 88 connected to a first end of the frame assembly 26 adjacent to the inlet port 14, and a second interior partition 90 connected to a second end of the frame assembly 26 adjacent to the outlet port. In the example illustrated, each of the first and second interior partitions 88, 90 are curved to assist with guiding fluid flow in the upstream and downstream chamber sections 22, 24.

In the example illustrated, the apparatus 10 includes a secondary housing 92 joined to the housing 12. The secondary housing 92 defines a secondary chamber 94, which receives fluid flow from the outlet port 16 and may assist in further noise reduction. In the example illustrated, the secondary housing 92 includes a secondary outlet 96 that is coaxial with the central axis 20, whereas the outlet port 16 has an outlet port axis 98 that is parallel to but offset from the central axis 20.

Figure 6:
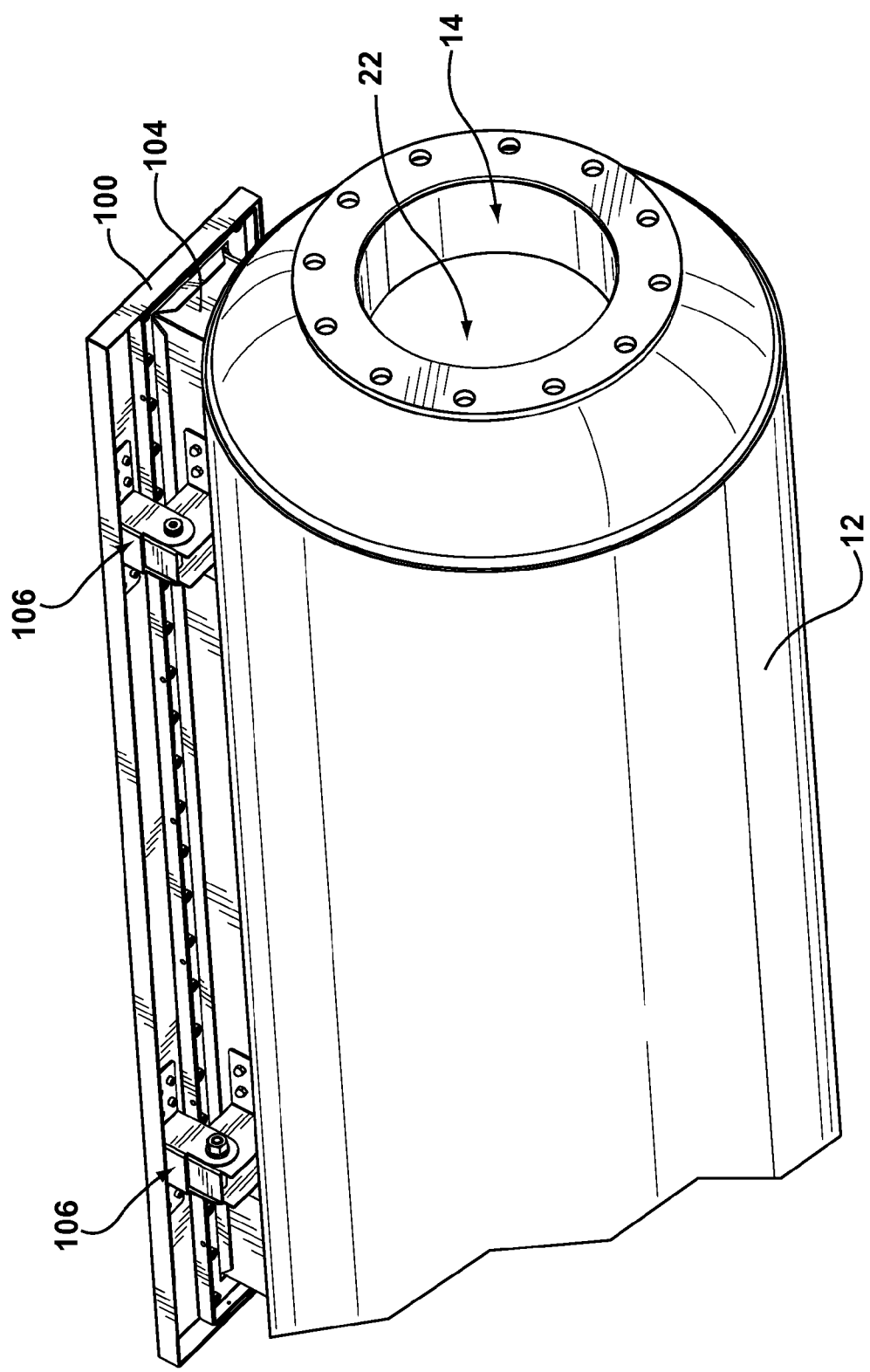
FIG. 6 is a partial perspective end view of the apparatus.

Referring to FIGS. 4 and 5, the apparatus 10 is shown to include a lid 100 that is movable between an open position (FIG. 4) in which access to the chamber is permitted through the access opening 25 and a closed position (FIG. 5) in which the lid 100 generally seals the access opening 25. The lid 100 may include a handle 102. In the example illustrated, the apparatus 10 includes an access tower 104 which may accommodate the upper portion of the frame assembly 26 (e.g., the handles 84) so that these components are not arranged within the housing 12. Referring to FIG. 6, the lid 100 is shown coupled to the access tower 104 by hinge mechanisms 106. The lid 100 may be counterweighted to make opening easier.

Referring to FIG. 3, the apparatus 10 is shown to include flow distributors 108 arranged within the upstream chamber section 22 to divert at least a portion of the fluid to flow toward the catalyst panel 30 closer to the inlet port 14 than the outlet port 16. In the example illustrated, the flow distributors 108 include fins 110 secured to an interior sidewall of the housing 12. In the example illustrated, the fins 110 are mounted to plates 111. The plates 111 may be semi-cylindrical in shape, and may be welded or otherwise fixed within the upstream chamber section 22 of the housing 12.

Figure 15:
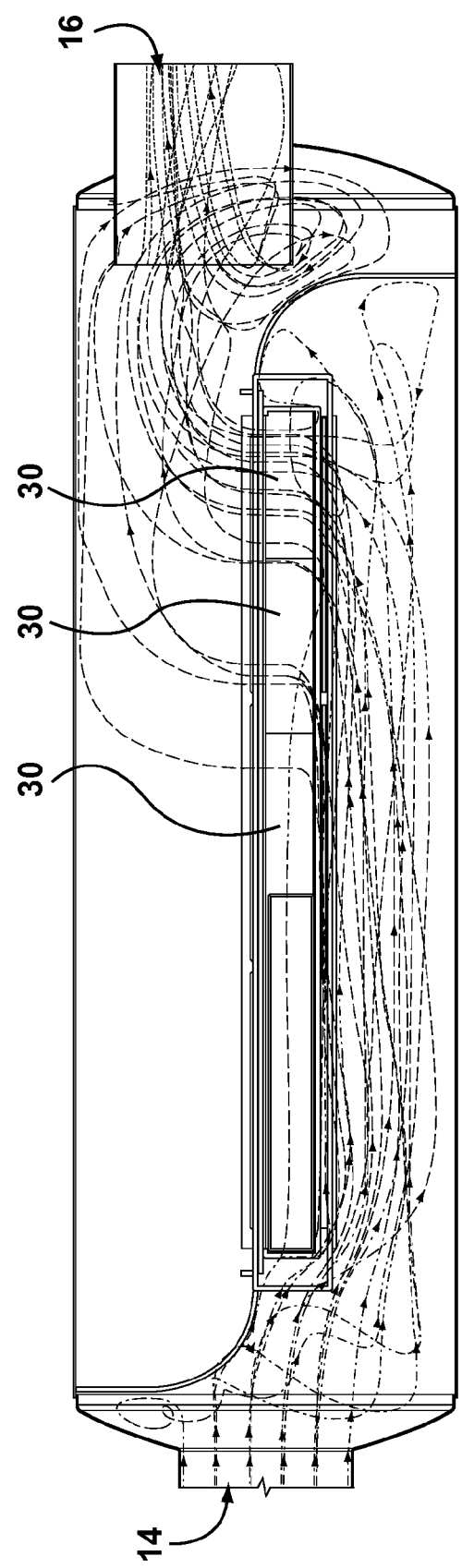
FIGS. 15 and 16 are schematic side views showing flows of fluid in the apparatus without and with flow distributors, respectively.
Figure 16:
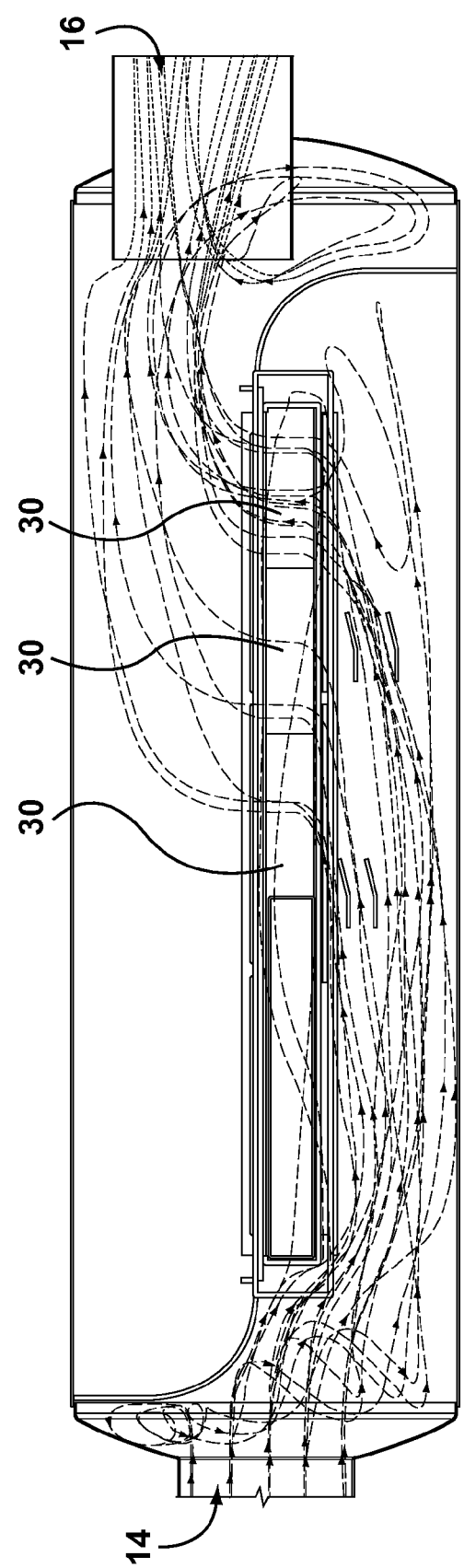

The inventors carried out flow modeling analyses for the apparatus. FIG. 15 shows fluid flowing through the apparatus without the flow distributors 108. Most of the fluid is shown to flow through the catalyst panel 30 closest to the outlet port 16. FIG. 16 shows flows through the apparatus with the flow distributors 108. The fluid is shown to flow through the catalyst panels 30 in a more uniform manner. FIG. 17 is a graph showing a calculated normalized flow uniformity index for the design without the flow distributors 108 (A) and the design with the flow distributors 108 (B). FIG. 18 is a graph showing a calculated normalized back pressure for the design without the flow distributors 108 (A) and the design with the flow distributors 108 (B).

In use, the apparatus 10 is connected to piping (not shown) so that the fluid to be treated is supplied to the inlet port 14, and treated fluid is delivered away from the secondary outlet 96. For example, in engine exhaust treatment implementations, the inlet port 14 may be bolted, welded, or otherwise connected (e.g., using one or more band clamps) to piping that is attached to an engine exhaust manifold. The secondary outlet 96 may similarly be bolted, welded, or otherwise connected to piping that delivers the treated exhaust gas to the atmosphere. The lid 100 is opened, and the catalyst panels 30 are inserted into the housing 12, and are removably supported in the flow passage 28. The blocking panel 32 may then be adjusted, using the manipulator 70, to obstruct the remaining area of the flow passage 28. The lid 100 may then be closed, and the apparatus 10 is ready for operation.

Referring to FIGS. 19 and 20, another silencer and catalytic converter apparatus is shown generally at reference numeral 112. The apparatus 112 is shown to include a housing 114, a secondary housing 116, an inlet port 118, a secondary outlet 120, and two lids 122 for accessing two separate access openings (not shown).

Figure 21:
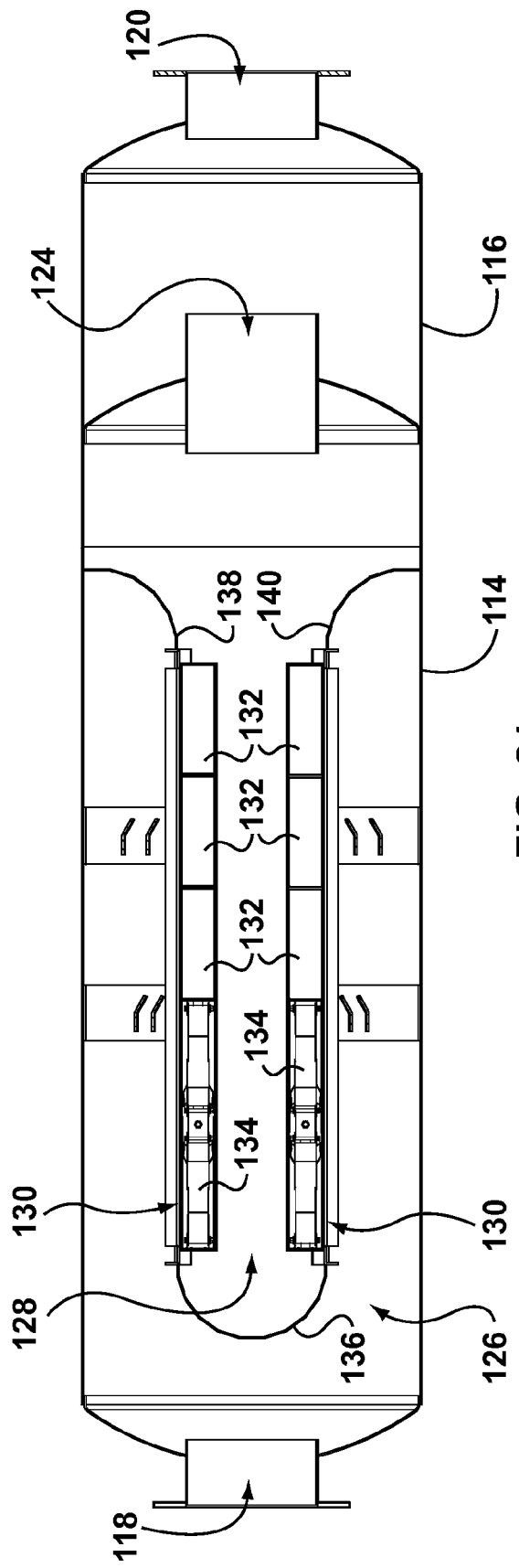
FIG. 21 is a sectional view of FIG. 21.

Referring to FIG. 21, the housing 114 includes an outlet port 124 spaced apart from the inlet port 118. An upstream chamber section 126 is enclosed by the housing 114 and is in fluid communication with the inlet port 118. A downstream chamber section 128 is enclosed by the housing 114 and is in fluid communication with the outlet port 124.

In the example illustrated, the apparatus 112 includes two frame assemblies 130 arranged in parallel in the housing 114 on laterally opposing sides of the downstream chamber section 128. The frame assemblies 130 define two opposing flow passages between the upstream and downstream chamber sections 126, 128. Each of the frame assemblies 130 receives one or more catalyst panels 132 inserted through the access openings, and blocking panels 134. The apparatus 112 is shown to include first, second and third interior partitions 136, 138, 140 separating the upstream and downstream chamber sections 126, 128.

While the above description provides examples of one or more apparatuses or methods, it will be appreciated that other apparatuses or methods may be within the scope of the accompanying claims.

We claim:

1. A silencer and catalytic converter apparatus, comprising:
    a housing comprising an inlet port, an outlet port spaced apart from the inlet port in an axial direction, an upstream chamber section enclosed by the housing in fluid communication with the inlet port, a downstream chamber section enclosed by the housing in fluid communication with the outlet port, and an access opening;
    a frame assembly arranged in the housing and defining a flow passage between the upstream and downstream chamber sections, the frame assembly for receiving at least one catalyst panel inserted through the access opening and supporting the at least one catalyst panel to occupy an area of the flow passage; and
    a blocking panel supported by the frame assembly to obstruct a remaining area of the flow passage so that fluid flowing between the upstream and downstream chamber sections is directed to flow through the at least one catalyst panel, the blocking panel being adjustable to accommodate catalyst panels of different sizes.

2. The apparatus of claim 1, wherein the flow passage has a width extending in the axial direction partially between the inlet and outlet ports, the at least one catalyst panel occupies a portion of the width, and the blocking panel is adjustable to obstruct a remaining portion of the width adjacent to the at least one catalyst panel.

3. The apparatus of claim 2, wherein the blocking panel comprises overlapping first and second plate members that are movable relative to one another between a contracted position and an expanded position in which a width dimension of the blocking panel is greater than in the contracted position.

4. The apparatus of claim 3, wherein the blocking panel comprises first and second scissor segments coupled to the first plate member and arranged to pivot between the contracted and expanded positions.

5. The apparatus of claim 4, wherein the blocking panel comprises a control member arranged to decrease a distance between first ends of the first and second scissor segments to increase the width dimension of the blocking panel.

6. The apparatus of claim 5, wherein the control member comprises a threaded rod that is coupled to the first end of the first scissor segment and is arranged to move the first end relative to the first end of the second scissor segment.

7. The apparatus of claim 6, wherein an upper end of the control member comprises a manipulator that is accessible via the access opening.

8. The apparatus of claim 6, wherein a second end of the first scissor segment is pivotally coupled to a lower end portion of the first plate member, and a second end of the second scissor segment is slidingly coupled to an upper edge portion of the first plate member.

9. The apparatus of claim 3, wherein the blocking panel comprises:
    first and second scissor segments, each of the first and second scissor segments having a first end and a second end, the second end of the first scissor segment pivotally coupled to the first plate member, the second end of the second scissor segment slidingly coupled to the first plate member spaced apart from the second end of the first scissor segment;
    third and fourth scissor segments, each of the third and fourth scissor segments having a first end and a second end, the second end of the third scissor segment pivotally coupled to the second plate member, the second end of the fourth scissor segment slidingly coupled to the second plate member spaced apart from the second end of the third scissor segment;
    a first connector pivotally coupled to the first ends of the first and third scissor segments;
    a second connector pivotally coupled to the first ends of the second and fourth scissor segments; and
    a control member arranged to move at least one of the first and second connectors to draw the first and second connectors together to move first and second plate members between the contracted and expanded positions.

10. The apparatus of claim 9, wherein the control member comprises a threaded rod, and the first connector is threadingly coupled onto the threaded rod.

11. The apparatus of claim 1, wherein the frame assembly comprises c-channel border members for establishing a labyrinth seal against respective edges of the at least one catalyst panel.

12. The apparatus of claim 1, wherein the frame assembly is insertable into and removable from the housing via the access opening.

13. The apparatus of claim 1, comprising a first interior partition connected to a first end of the frame assembly adjacent to the inlet port, and a second interior partition connected to a second end of the frame assembly adjacent to the outlet port.

14. The apparatus of claim 13, wherein each of the first and second interior partitions are curved.

15. The apparatus of claim 1, comprising at least one flow distributor arranged within the upstream chamber section for diverting at least a portion of the fluid to flow toward the at least one catalyst panel closer to the inlet port than the outlet port.

16. The apparatus of claim 15, wherein the at least one flow distributor comprises at least one fin secured to an interior sidewall of the housing.

17. The apparatus of claim 1, comprising a lid that is movable between an open position in which access to the chamber is permitted through the access opening and a closed position in which the lid generally seals the access opening.

18. The apparatus of claim 1, comprising at least one of the catalyst panels received by the frame assembly.

19. An apparatus, comprising:
a housing comprising an inlet port, an outlet port spaced apart from the inlet port in an axial direction, an upstream chamber section enclosed by the housing in fluid communication with the inlet port, a downstream chamber section enclosed by the housing in fluid communication with the outlet port, a first interior partition separating the upstream and downstream chamber sections adjacent to the inlet port, a second interior partition separating the upstream and downstream chamber sections adjacent to the outlet port, and an access opening;

a frame assembly arranged in the housing for receiving at least one catalyst panel inserted through the access opening and supporting the at least one catalyst panel, the frame assembly comprising a first end secured to the first interior partition, a second end secured to the second interior partition, and a lateral flow passage extending between the first and second ends and connecting the upstream and downstream chamber sections in fluid communication; and a blocking panel supported by the frame assembly to obstruct an area of the flow passage so that fluid flowing between the upstream and downstream chamber sections is directed to flow through the at least one catalyst panel, the blocking panel being movable between a contracted position and an expanded position in which a width dimension of the blocking panel is greater than in the contracted position to accommodate catalyst panels of different sizes.

* * * * *